(12) United States Patent
Zurawski et al.

(10) Patent No.: US 6,601,387 B2
(45) Date of Patent: Aug. 5, 2003

(54) SYSTEM AND METHOD FOR DETERMINATION OF EGR FLOW RATE

(75) Inventors: Mark Allen Zurawski, Northville, MI (US); Phillip F. Rimnac, Saline, MI (US); Peter Zagone, Huntington Woods, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/010,986

(22) Filed: Dec. 5, 2001

(65) Prior Publication Data

US 2003/0101724 A1 Jun. 5, 2003

(51) Int. Cl.$^7$ .......................... F02B 33/44; F02M 25/07
(52) U.S. Cl. ................... 60/605.2; 123/568.21; 123/568.31
(58) Field of Search .................. 60/605.2; 123/568.21, 123/568.31

(56) References Cited

U.S. PATENT DOCUMENTS

| | | |
|---|---|---|
| 4,134,377 A | 1/1979 | Bamsey et al. |
| 4,147,141 A | 4/1979 | Nagano |
| 4,234,040 A | 11/1980 | Argyle et al. |
| 4,258,687 A | 3/1981 | Mauch et al. |
| 4,267,812 A | 5/1981 | Aula et al. |
| 4,291,760 A | 9/1981 | Argyle et al. |
| 4,436,147 A | 3/1984 | Hudson, Jr. |
| 5,203,311 A | 4/1993 | Hitomi et al. |
| 5,440,880 A | 8/1995 | Ceynow et al. |
| 5,607,010 A | 3/1997 | Schonfeld et al. |
| 5,617,726 A | 4/1997 | Sheridan et al. |
| 5,669,365 A | 9/1997 | Gartner et al. |
| 5,732,688 A | 3/1998 | Charlton et al. |
| 5,740,786 A | 4/1998 | Gartner |
| 5,771,868 A | 6/1998 | Khair |
| 5,778,674 A * | 7/1998 | Kimura ..................... 60/605.2 |
| 5,785,030 A | 7/1998 | Paas |
| 5,802,846 A | 9/1998 | Bailey |
| 6,003,315 A | 12/1999 | Bailey |
| 6,009,709 A | 1/2000 | Bailey |
| 6,062,304 A | 5/2000 | Kremer et al. |
| 6,079,395 A | 6/2000 | Coleman |
| 6,085,732 A | 7/2000 | Wang et al. |
| 6,116,026 A | 9/2000 | Freese, V |
| 6,138,649 A | 10/2000 | Khair et al. |
| 6,155,042 A | 12/2000 | Perset et al. |
| 6,161,528 A | 12/2000 | Akao et al. |
| 6,164,071 A | 12/2000 | Shao et al. |
| 6,321,732 B1 * | 11/2001 | Kotwicki et al. ...... 123/568.21 |
| 6,367,256 B1 * | 4/2002 | McKee ..................... 60/605.2 |

* cited by examiner

Primary Examiner—Sheldon J. Richter
(74) Attorney, Agent, or Firm—Brooks & Kushman P.C.

(57) ABSTRACT

A system and method for determining EGR flow in a multi-cylinder internal combustion engine include determining specific heat of the exhaust gas based on current engine operating conditions and determining EGR flow rate based on the determined specific heat and a signal provided by a sensor. In one embodiment, a species tracking model is used to determine the amount of various species within the exhaust gas which may include oxygen, nitrogen, carbon dioxide, and water, for example, to determine the current specific heat, which is compared to a reference specific heat for the sensor, the difference being used to adjust the sensor value and determine the EGR mass flow rate. The species tracking model uses a simplified combustion model to estimate the amount of each specie in the exhaust gas based on various engine operating parameters, such as fuel, air/fuel ratio, and turbo boost, for example.

30 Claims, 5 Drawing Sheets

SYSTEM AND METHOD FOR DETERMINATION OF EGR FLOW RATE

BACKGROUND OF THE INVENTION

1. Field of the Invention

The present invention relates to a system and method for determining exhaust gas recirculation (EGR) flow for a multi-cylinder internal combustion engine.

2. Background Art

To improve performance, many internal combustion engines, particularly diesel engines, include a turbocharger to increase the oxygen density of the cylinder charge. Turbochargers use the engine exhaust gases to operate a turbine which in turn powers a compressor to compress intake air. Variable geometry turbochargers (VGT), which include variable nozzle turbochargers (VNT), are used to modify turbocharger characteristics over a broader engine operating range than possible with conventional turbochargers. Moveable intake or exhaust vanes (VNT) or a moveable turbine sidewall may be used to provide an appropriate amount of turbo boost pressure for current operating conditions and driver demanded engine torque.

Exhaust gas recirculation (EGR) has known advantages with respect to reducing emissions of nitrogen oxides (NOx) by reducing peak combustion temperatures within the engine cylinders during transient and steady-state operating conditions. A typical EGR system may include an EGR valve which diverts engine exhaust gases from the engine exhaust manifold to the engine intake manifold. The EGR valve may be an on/off type or modulating (proportional) type to regulate EGR flow and may be mounted at various places in the EGR circuit. In addition, an EGR cooler is often provided to cool the diverted exhaust gas with a rate measuring device to determine the amount or flow rate of diverted exhaust gas with appropriate tubing or piping connecting the exhaust side of the engine (exhaust manifold or turbocharger turbine) to the intake side of the engine (intake manifold or intake piping). The management of EGR flow is performed by an electronic engine control unit (ECU) in communication with the EGR valve and flow rate measurement device with the ECU providing closed loop control of EGR flow when operating conditions permit. The ECU will regulate the VGT and/or EGR valve based on input from the rate measurement device. Other derivatives of this arrangement may include a mixing device at the point of EGR gas entry to the inlet manifold and/or a venturi device to encourage a negative pressure differential across the engine as required to drive EGR flow from the exhaust side to the intake side of the engine. The ECU requires an accurate flow rate measurement and responsive control devices (EGR valve and/or VGT) to provide appropriate transient and steady state control to deliver expected performance and reduced emissions.

Optimization of engine emissions, performance, and fuel economy depends on the accuracy, response, and durability of the EGR system components, particularly the EGR measuring device. One method of EGR measurement provides a known restriction in the EGR circuit and measures the temperature and pressure drop across the restriction to determine the EGR rate. As the restriction increases, the accuracy of the rate calculation increases. However, the larger restriction inhibits the ability to flow EGR, is less accurate at low flow rates, and may be more susceptible to fouling. The restriction also requires the VGT to be controlled to provide more back pressure to drive the necessary amount of EGR which may impact the durability and reliability of the turbo machinery. In addition, the response is directly related to the temperature sensor response time which may be on the order of ten to fifteen seconds and makes transient control more difficult and complex. While software strategies can be applied to improve the response time by anticipating the rise in temperature, the harsh EGR environment may result in soot buildup over time on the sensing element which degrades the accuracy and performance.

A thermal anemometer may be used to measure EGR flow. Again, optimization of performance, fuel economy, and emissions is a function of the accuracy, response, and durability of the EGR rate measuring device. Anemometer accuracy is dependent on the specific heat of the gas being measured. For an EGR circuit, the specific heat of the exhaust gas can vary up to 10% over the operating range of a diesel engine the response of an anemometer device will be dependent on the temperature controller and the heater element design. Durability depends on the susceptibility to fouling and plugging.

SUMMARY OF THE INVENTION

The present invention provides a system and method for calculating EGR flow rate that includes a more accurate, responsive, durable, and/or reliable system and method for measuring or calculating EGR flow.

In one embodiment of the present invention, a method for determining EGR flow in a multi-cylinder internal combustion engine having a sensor for providing a signal indicative of flow of exhaust gas through an EGR circuit includes determining specific heat of the exhaust gas based on current engine operating conditions and determining EGR flow rate based on the determined specific heat and the signal provided by the sensor. A species tracking model is used to determine the amount of various species within the exhaust gas which may include oxygen, nitrogen, carbon dioxide, and water, for example, to determine the current specific heat. The current specific heat is compared to the specific heat for which the sensor has been calibrated with the difference used to adjust the sensor value and determine the EGR mass flow rate. A combustion model may be used in conjunction with the species tracking model to determine or estimate the amount of each species in the exhaust gas based on various engine operating parameters, such as fuel, air/fuel ratio, and turbo boost, for example.

The present invention provides a number of advantages relative to the prior art. For example, the present invention provides a more accurate, reliable, and durable EGR flow measuring device to optimize engine performance, fuel economy and emissions. Use of an anemometer-type flow measurement sensor eliminates any restriction in the EGR circuit otherwise required by a delta pressure sensor which may improve durability of turbo machinery by reducing required back pressure. The present invention provides a more accurate determination of EGR flow using an on-line determination of the current specific heat of exhaust gas passing through the EGR circuit using a species tracking model based on current engine operating parameters and conditions.

The above advantages, and other advantages, objects, and features of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
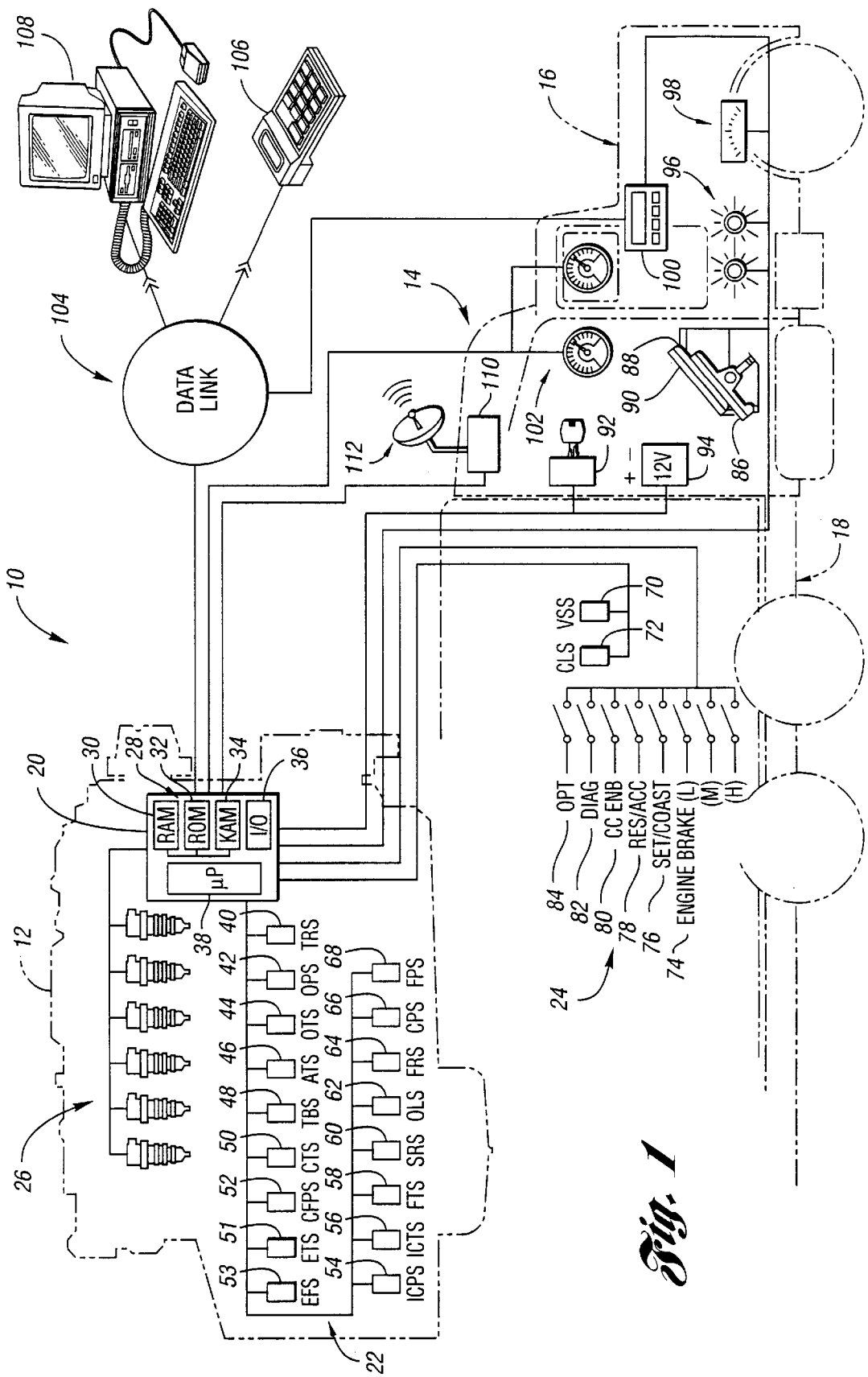
FIG. 1 is a block diagram illustrating one application of a system or method for determining EGR flow according to one embodiment of the present invention.

FIG. 1 provides a schematic/block diagram illustrating operation of a system or method for EGR flow measurement in a representative application according to one embodiment of the present invention. System 10 includes an internal combustion engine, such as a diesel engine 12, which may be installed in a vehicle 14 depending upon the particular application. In one embodiment, vehicle 14 includes a tractor 16 and semi-trailer 18. Diesel engine 12 is installed in tractor 16 and interfaces with various sensors and actuators located on engine 12, tractor 16, and semi-trailer 18 via engine and vehicle wiring harnesses as described in further detail below. In other applications, engine 12 may be used to operate industrial and construction equipment, or in stationary applications for driving generators, compressors, and/or pumps and the like.

An electronic engine control module (ECM) 20 receives signals generated by engine sensors 22 and vehicle sensors 24 and processes the signals to control engine and/or vehicle actuators such as fuel injectors 26. ECM 20 preferably includes computer-readable storage media, indicated generally by reference numeral 28 for storing data representing instructions executable by a computer to control engine 12. Computer-readable storage media 28 may also include calibration information in addition to working variables, parameters, and the like. In one embodiment, computer-readable storage media 28 include a random access memory (RAM) 30 in addition to various non-volatile memory such as read-only memory (ROM) 32, and keep-alive memory (KAM) 34. Computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data which includes solid state, magnetic, optical, and combination devices. For example, computer readable storage media 28 may be implemented using one or more physical devices such as DRAM, PROMS, EPROMS, EEPROMS, flash memory, and the like. Depending upon the particular application, computer-readable storage media 28 may also include floppy disks, CD ROM, and the like.

In a typical application, ECM 20 processes inputs from engine sensors 22, and vehicle sensors/switches 24 by executing instructions stored in computer-readable storage media 28 to generate appropriate output signals for control of engine 12. Depending upon the particular application, system 10 may include various types of sensors to monitor engine and vehicle operating conditions. For example, variable reluctance sensors may be used to monitor crankshaft position and/or engine speed. Variable capacitance sensors may be used to monitor various pressures such as barometric air, manifold, oil gallery, and optional pump pressures. Variable resistance sensors may be used to monitor positions such as a throttle (accelerator foot pedal) position. Magnetic pick-up sensors may be used to sense vehicle speed, accumulate trip distance, and for various other vehicle features. Likewise, thermistors may be used to monitor various temperatures such as coolant, oil, and ambient air temperatures, for example. In one embodiment of the present invention, engine sensors 22 include a timing reference sensor (TRS) 40 which provides an indication of the crankshaft position and may be used to determine engine speed. An oil pressure sensor (OPS) 42 and oil temperature sensor (OTS) 44 are used to monitor the pressure and temperature of the engine oil, respectively.

An air temperature sensor (ATS) 46 is used to provide an indication of the current intake air temperature. A turbo boost sensor (TBS) 48 is used to provide an indication of the boost pressure of a turbocharger which is preferably a variable geometry or variable nozzle turbocharger as described in greater detail below. Coolant temperature sensor (CTS) 50 is used to provide an indication of the coolant temperature.

Depending upon the particular engine configuration and application, various additional sensors may be included. For example, engines which utilize exhaust gas recirculation (EGR) according to the present invention preferably include an EGR temperature sensor (ETS) 51 and an EGR flow sensor (EFS) 53. EFS 53 is preferably a thermal anemometer type sensor which calculates the power dissipated through a heater element to determine the mass flow rate of EGR through the EGR circuit. The heated element preferably provides pyrolitic cleaning by being heated to a temperature to reduce or prevent soot. The EGR mass flow rate is determined based on the specific heat of the EGR gas as determined according to the present invention and described in greater detail below.

Applications utilizing a common rail fuel system may include a corresponding fuel pressure sensor (CFPS) 52. Similarly, an intercooler coolant pressure sensor (ICPS) 54 and temperature sensor (ICTS) 56 may be provided to sense the pressure and temperature of the intercooler coolant. Engine 12 also preferably includes a fuel temperature sensor (FTS) 58 and a synchronous reference sensor (SRS) 60. SRS 60 provides an indication of a specific cylinder in the firing order for engine 12. This sensor may be used to coordinate or synchronize control of a multiple-engine configuration such as used in some stationary generator applications. An EGR cooler (not shown) and corresponding temperature sensor may also be provided to cool recirculated exhaust gas prior to introduction to the engine intake.

Engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A fuel pressure sensor (FPS) 68 provides an indication of fuel pressure to warn of impending power loss and engine fueling. Similarly, a crankcase pressure sensor (CPS) 66 provides an indication of crankcase pressure which may be used for various engine protection features by detecting a sudden increase in crankcase pressure indicative of an engine malfunction.

System 10 preferably includes various vehicle sensors/switches 24 to monitor vehicle operating parameters and driver input used in controlling vehicle 14 and engine 12. For example, vehicle sensors/switches 24 may include a vehicle speed sensor (VSS) 70 which provides an indication of the current vehicle speed. A coolant level sensor (CLS) 72 monitors the level of engine coolant in a vehicle radiator. Switches used to select an engine operating mode or otherwise control operation of engine 12 or vehicle 14 may include an engine braking selection switch 74 which preferably provides for low, medium, high, and off selections, cruise control switches 76, 78, and 80, a diagnostic switch 82, and various optional, digital, and/or analog switches 84. ECM 20 also receives signals associated with an accelerator or foot pedal 86, a clutch 88, and a brake 90. ECM 20 may also monitor position of a key switch 92 and a system voltage provided by a vehicle battery 94.

ECM 20 may communicate with various vehicle output devices such as status indicators/lights 96, analog displays 98, digital displays 100, and various analog/digital gauges 102. In one embodiment of the present invention, ECM 20 utilizes an industry standard data link 104 to broadcast various status and/or control messages which may include engine speed, accelerator pedal position, vehicle speed, and the like. Preferably, data link 104 conforms to SAE J1939 and SAE J1587 to provide various service, diagnostic, and control information to other engine systems, subsystems, and connected devices such as display 100. Preferably, ECM 20 includes control logic to determine EGR flow using a species tracking model based on current engine operating parameters and conditions as described in greater detail below.

A service tool 106 may be periodically connected via data link 104 to program selected parameters stored in ECM 20 and/or receive diagnostic information from ECM 20. Likewise, a computer 108 may be connected with the appropriate software and hardware via data link 104 to transfer information to ECM 20 and receive various information relative to operation of engine 12, and/or vehicle 14.

Figure 2:
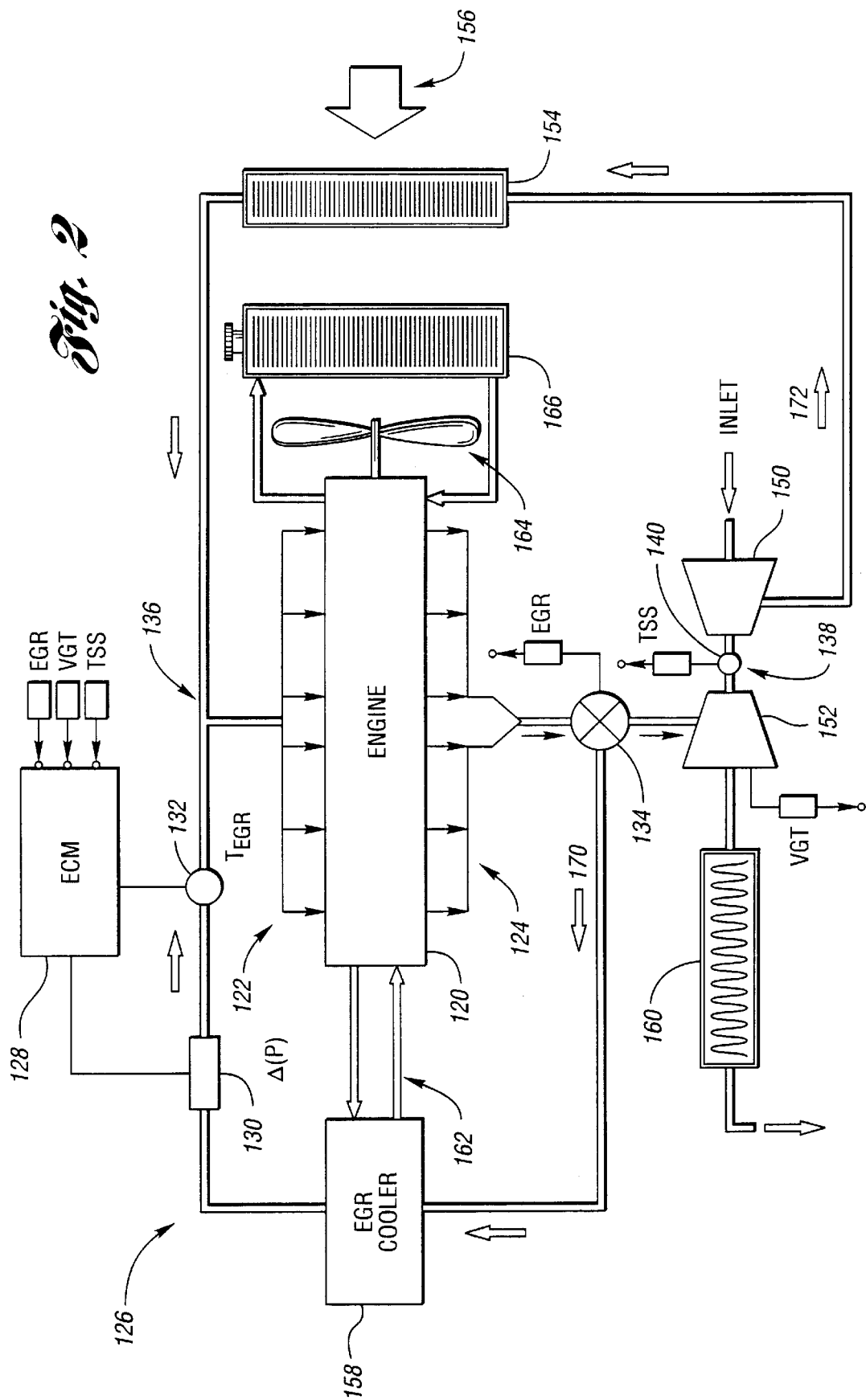
FIG. 2 is a block diagram illustrating a representative EGR system for determining EGR flow according to one embodiment of the present invention.

FIG. 2 is a block diagram illustrating a representative EGR system with associated EGR temperature sensor and flow sensor in communication with and ECM having control logic to determine EGR flow according to the present invention. Engine 120 includes an intake manifold 122, an exhaust manifold 124, and an exhaust gas recirculation (EGR) system indicated generally by reference numeral 126. An engine control module (ECM) 128 includes stored data representing instructions and calibration information for controlling engine 120. ECM 128 communicates with various sensors and actuators including EGR sensors such as EGR flow sensor 130 and EGR temperature sensor 132. As described above, EGR flow sensor 130 is preferably an anemometer-type sensor which generates a signal based on convective cooling of a heater element by the EGR flow. ECM 128 controls EGR system 126 via actuators such as an EGR valve 134. In addition, ECM 128 preferably controls a variable nozzle or variable geometry turbocharger (VGT) 138 and monitors an associated turbo speed sensor 140 and turbo boost sensor as described with reference to FIG. 1.

In operation, ECM 128 controls EGR system 126 and VGT 138 based on current operating conditions and calibration information to mix recirculated exhaust gas with charge air via EGR valve 134 which is provided to engine 120 through intake manifold 122. In one preferred embodiment, engine 120 is a 6-cylinder compression-ignition internal combustion engine. ECM 128 includes control logic to monitor current engine control parameters and operating conditions to control EGR valve 134 based on a desired and determined EGR flow. The determined EGR flow is based on a signals generated by EGR flow sensor 130 and EGR temperature sensor 132. According to the present invention, ECM 128 includes control logic to determine specific heat of the recirculated exhaust gas based on current engine operating parameters and conditions. The determined specific heat may then be compared to a reference or calibrated specific heat for the flow sensor with the EGR flow determination adjusted to account for any difference between the current specific heat of the recirculated exhaust gas and the reference or calibration value.

During operation of engine 120, intake air passes through compressor portion 150 of VGT 138 which is powered by turbine portion 152 via hot exhaust gasses. Compressed air travels through charge air cooler 154 which is preferably an air-to-air cooler cooled by ram air 156. Charge air passes through cooler 154 to mixer valve 136 which is preferably a pipe union where it is combined with recirculated exhaust gas based on current engine operating conditions. Exhaust gas exiting engine 120 through exhaust manifold 124 passes through EGR valve 134 where a portion of the exhaust gas may be diverted through EGR cooler 158, past EGR flow sensor 130, and temperature sensor 132 to mixing valve 136 where it is combined with compressed charge air. The remaining exhaust gasses not diverted by EGR valve 134 pass through turbine portion 152 of VGT 138 and muffler 160 before being exhausted to atmosphere. EGR cooler 158 cools the heated exhaust gas using engine coolant circuit 162. Engine coolant is in turn cooled via a cooling fan 164 and radiator 166.

Embodiments of the present invention include control logic that processes various inputs representing various engine conditions, and in turn, provides an EGR command signal and a VGT command signal. The EGR command signal commands a position for the variable flow EGR valve 134 to control gas flow through path 170, while the VGT command signal commands a geometry for VGT 138 to control gas flow through path 172. In a preferred embodiment of the present invention, the various techniques utilized to determine the EGR and VGT command signals are best shown in FIG. 3.

Figure 3:
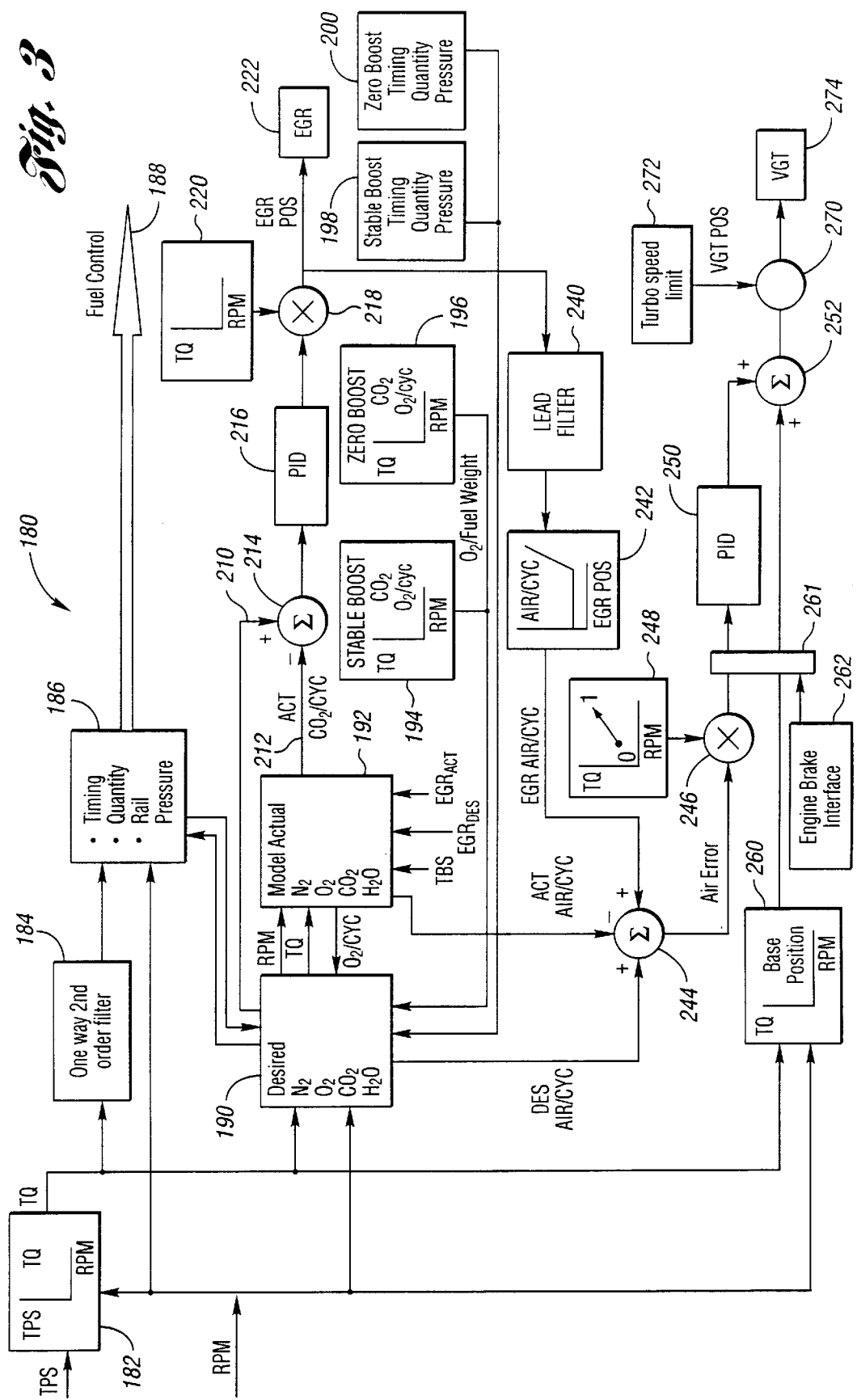
FIG. 3 is a block diagram illustrating use of a species tracking model for determining EGR flow and controlling an EGR valve and/or VGT according to one embodiment of the present invention.

In FIG. 3, a block diagram 180 illustrates the functions of the control logic for determination of EGR flow according to the present invention. As described above, in a turbocharged diesel engine pressure differential necessary to drive the EGR flow from exhaust to intake manifold may be provided or augmented by the variable geometry turbocharger. The control of the EGR flow rate may be achieved by changing the geometry of the VGT (for example, vane position change), by changing the EGR valve position, and preferably via a combination of both. However, various aspects of the present invention may be used separately or together while still obtaining the benefits and advantages of the invention. In the preferred embodiment, the EGR valve and the VGT are controlled simultaneously and continuously. Preferred implementations of the present invention utilize desired intake manifold composition in terms of chemical species ($O_2$, $N_2$, $CO_2$ and $H_2O$) as a set point for the EGR/VGT controller. The actual quantity of these chemical species is preferably calculated using a species tracking model based on a simplified combustion model.

With continuing reference to FIG. 3, in the embodiment illustrated, a driver accelerator pedal position sensor input and an engine speed (rpm) input are received at block 182. Block 182 uses a look up table to determine an engine torque demand. The engine torque demand represents a fuel quantity that may be adjusted for other aspects of engine control that are not specifically described herein such as, for example, cylinder balancing. Further, it is appreciated that FIG. 3 illustrates a representative implementation and that various aspects of the control strategy shown are preferred, but not specifically required. At block 184, a one way, second order filter adds some delay to the torque demand. Delay is added to allow the slower responding air flow aspects of engine control to be synchronized with the faster responding torque demand aspects of engine control. At block 186, engine speed and filtered torque demand are received, and processed along with other engine conditions, resulting in a desired fuel injection timing, quantity, and rail pressure. These factors control fuel delivery, indicated at 188.

At block 190, a desired chemical composition for the engine air intake is determined. The desired composition includes a plurality of chemical species such as nitrogen, oxygen, carbon dioxide, and water, for example. The fuel per cycle is provided to block 190 from injection control block 186, and block 190 provides a fuel limit per cycle to block 186. For example, fuel may be limited in low airflow conditions. At block 192, actual flow values for the EGR system and turbocharging system, the air/fuel ratio, and chemical composition of the intake gasses are calculated. The calculations are based on sensor inputs and a species tracking model which incorporates a simplified combustion model to determine the relative proportions of various chemical species in the intake and recirculated exhaust gas. The desired or set point values in block 190 are based on interpolation of values contained within various pairs of look up tables. The first table pair (194,198) corresponds to stabilized turbocharger boost pressure and the second table pair (196,200) corresponds to zero turbocharger boost pressure. That is, the first table corresponds to maximum air per fuel (per cycle) while the second table corresponds to minimum air per fuel. Depending on the current air per fuel as determined from various measurements, desired values are interpolated between the two tables for the particular operating value.

For example, desired carbon dioxide and air values are determined with an interpolation between tables 194 and 196 with each representing two look up tables, one table for $CO_2$ and one table for oxygen quantity/cycle. Similarly, desired values for timing parameters, quantity, and rail pressure are determined by interpolation (based on air per fuel) between tables 198 and 200 (block 198 and block 200 each represent three tables). In accordance with preferred embodiments of the present invention, controller 20 (FIG. 1) adjusts VGT and EGR operation to achieve the desired values at block 190 (calculated by interpolation) within the respective minimum/maximum tables (196,200 and 194, 198, respectively).

Further at block 190, a desired carbon dioxide quantity 210 is determined. From block 192, an actual carbon dioxide quantity is estimated. It is appreciated that the quantities are preferably represented as mass per cycle. Summer 214 compares the desired carbon dioxide quantity 210 to the actual carbon dioxide quantity 212 to determine the carbon dioxide error signal. EGR valve 222 is controlled by an EGR command signal based on the error signal. Preferably, a controller, such as a proportional/integral/derivative controller 216 (or preferably with a non linear compensation term, for example, a Smith predictor) adjusts the EGR valve position to achieve a desired EGR rate and desired carbon dioxide quantity. Further, in preferred embodiments, EGR loop gain normalization is contained within block 220 to improve transient response by reducing the effects of rapid changes in torque demand.

After loop gain normalization, limiter 218 restricts the EGR command signal as needed to prevent excessive exhaust smoke during transient engine operation. The resultant EGR command signal is supplied by controller 20 (FIG. 1) to EGR valve 222. Preferably, the EGR command signals also passed to the VGT control, as described below.

In controlling VGT 274, a base geometry (vane position in the preferred implementation), is determined at block 260 based on torque demand and engine speed. The base geometry block 260 serves as a feedforward feature for VGT control to improve transient response and also enable open loop control when desired. The commanded base position is passed from block 260 to block 261. At block 262, a brake interface allows engine braking control logic to override a commanded base position by the normal VGT logic in the event that the engine is being operated as an engine brake.

The EGR command signal is received by lead compensation logic 240 to determine a lead compensated signal based on the EGR command signal. In embodiments of the present invention, this portion of the control loop synchronizes simultaneous EGR valve and VGT geometry control. Particularly, when EGR valve control alone is not sufficient to achieve desired EGR rate, the VGT geometry is modified to increase air flow through the turbine until the desired EGR flow is achieved. The lead term 240 improves transient response to compensate for the turbo boost lag. That is, when EGR valve control and VGT geometry control are not sufficient to achieve desired carbon dioxide content in the engine intake, increased flow through the turbine increases the overall air flow, but the turbine becomes less efficient, increasing the back pressure that drives carbon dioxide containing exhaust gasses through the recirculation path increasing the carbon dioxide mass per cycle at the intake.

At block 242, an additional compensation term based on EGR valve position modifies the lead compensator output. As shown, summer 244 receives a desired air per cycle signal and an actual air per cycle signal to determine an air error. Lead compensator 240 and additional compensator 242 anticipate and exaggerate the air error when it is expected that the EGR valve is opening. The air error determined at block 244 and/or the base geometry (for example vane position) as determined at block 260 are used to determine the VGT command signal.

Preferably, at block 246, normalization values contained within block 248 linearize the loop gain of PID controller 250, and serve as a variable switch between open and closed loop control approaches. That is, at low air flow conditions (low engine speed and low torque demand), the normalization factor reduces the air error to zero or to a sufficiently low value so as to be effectively insignificant in controlling VGT 274. That is, at low air flow conditions, normalization effectively eliminates the air error signal leaving the base geometry (the feedforward term) to control the VGT in an open loop fashion. On the other hand, once air flow reaches a sufficient level, the gain normalization factor jumps from zero to a sufficiently great value to control VGT 274 and linearize PID controller 250. As air flow continues to increase, the normalization factor decreases because at higher air flows, PID controller 250 is more effective. The gain normalization term is zero at low air flows. Air flow is preferably determined as a function of torque demand and engine speed. Once significant air flow exists, the gain normalization term is significantly increased to change from effectively pure open loop control of the VGT with the feedforward term to closed loop control of the VGT (with the feedforward term). As airflow continues to increase, the gain normalization term is reduced.

As shown by summer 252, the base vane position (or other suitable geometry indicator depending on the implementation) from block 260 provides the general control of the VGT command signal, while the signal derived from the air error provides fine tuning (except at low air flow conditions where the air error portion is effectively ignored and open loop control used). Limiter 270 limits the VGT command signal as needed to prevent turbo overspeeding. For example, at higher altitudes, continued demands for more oxygen may result in a turbo overspeed. This situation is prevented by turbo speed limit at block 272. After limiting, if necessary, the VGT command signal is applied to VGT 274. As explained above, the EGR command signal is utilized (with lead compensation) to adjust an air error signal to provide fine tuning of the VGT command signal. As such, continuous, simultaneous control of both the EGR and VGT systems allow the effects of these systems on each other to be taken into account during the control strategy. Lead term 240 improves transient response. Accordingly, the control loop also works in the opposite direction, adjusting the EGR valve position if a desired boost (or air/fuel ratio) is not achieved. For tables 194 and 196, at lower oxygen per fuel, the value in the minimum $CO_2$ table commands a desired carbon dioxide quantity of zero. The upper $CO_2$ table represents desired $CO_2$ quantity at an upper oxygen per fuel ratio. The lower $CO_2$ defines a lower oxygen per fuel ratio at which desired $CO_2$ is zero. That is, when the engine is already running fuel rich, tables 194 and 196 are interpolated such that the desired carbon dioxide quantity is zero. As such, the function used to interpolate between the two carbon dioxide tables may be significantly different than the function used to interpolate between the two air quantity tables. Further, it is appreciated that the interpolation between any two tables is not limited to linear interpolation, but may take other forms.

Figure 4:
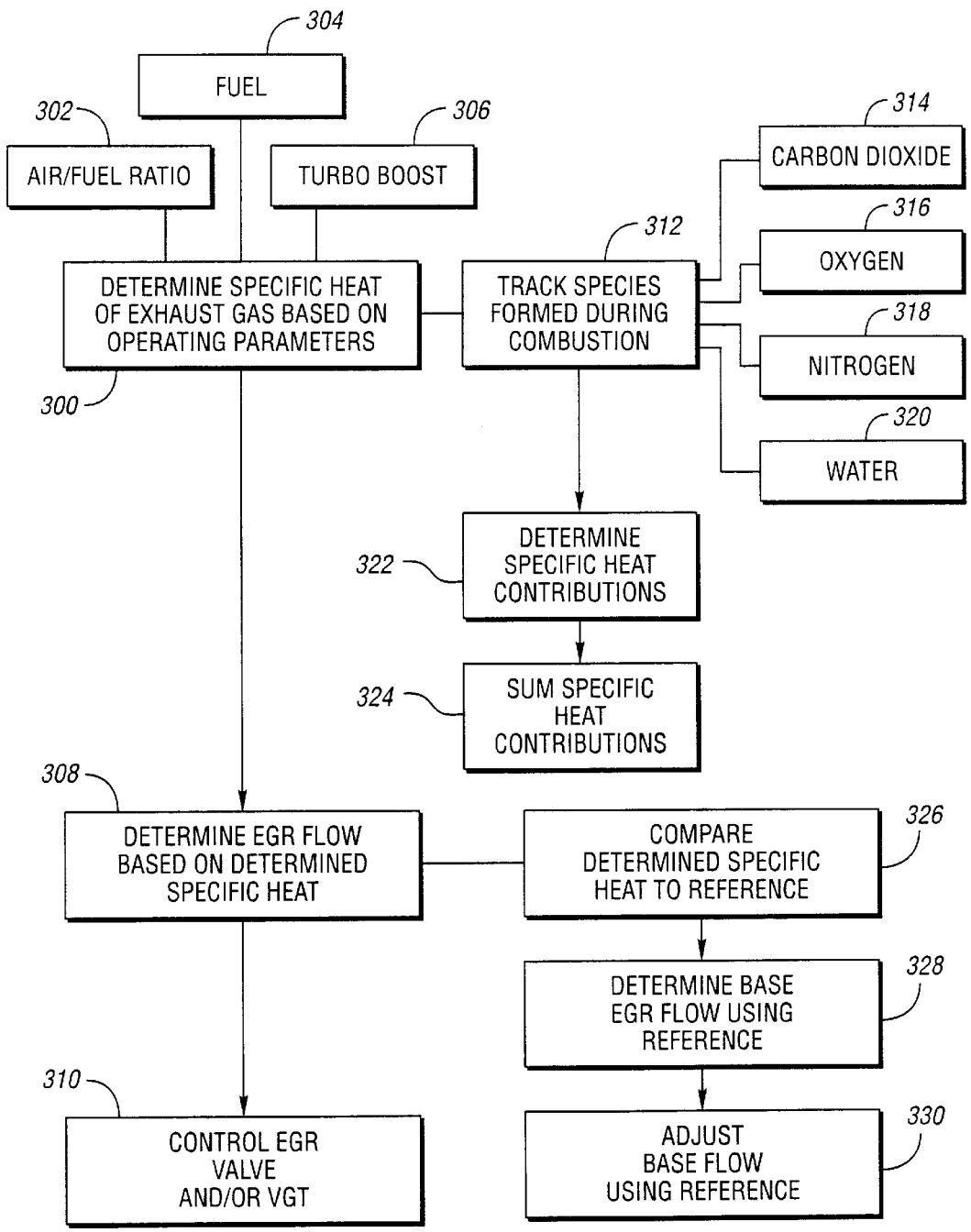
FIG. 4 is a flow diagram illustrating operation of a system or method for determining EGR flow according to one embodiment of the present invention.

A block diagram illustrating operation of one embodiment for a system or method for determining EGR flow according to the present invention is shown in FIG. 4. As will be appreciated by one of ordinary skill in the art, the block diagram of FIG. 4 represents control logic which may be implemented or effected in hardware, software, or a combination of hardware and software. The various functions are preferably effected by a programmed microprocessor, such as included in the DDEC controller manufactured by Detroit Diesel Corporation, Detroit, Mich. Of course, control of the engine/vehicle may include one or more functions implemented by dedicated electric, electronic, or integrated circuits. As will also be appreciated by those of skill in the art, the control logic may be implemented using any of a number of known programming and processing techniques or strategies and is not limited to the order or sequence illustrated in FIG. 4. For example, interrupt or event driven processing is typically employed in real-time control applications, such as control of an engine or vehicle rather than a purely sequential strategy as illustrated. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

In various embodiments of the present invention, the control logic illustrated is implemented primarily in software and is stored in computer readable storage media within the ECM. As one of ordinary skill in the art will appreciate, various control parameters, instructions, and calibration information stored within the ECM may be selectively modified by the vehicle owner/operator while other information is restricted to authorized service or factory personnel. The computer readable storage media may also be used to store engine/vehicle operating information for vehicle owners/operators and diagnostic information for maintenance/service personnel. Although not explicitly illustrated, various steps or functions may be repeatedly performed depending on the type of processing employed.

As illustrated in FIG. 4, the specific heat for the recirculated exhaust gas is determined based on current engine operating additions or parameters as represented by block 300. Current engine operating conditions or parameters may include control parameters in addition to variables which represent current operating characteristics of the engine. In one embodiment, air/fuel ratio 302, fuel quantity 304, and turbo boost pressure 306 are monitored and input to a simplified combustion model to determine the relative amounts or proportions of various individual chemical species as described in greater detail below. The EGR flow rate is then determined based on the specific heat corresponding to the current formulation of the recirculated exhaust gas as represented by block 308. The determined EGR flow may then be used to control the EGR valve and/or the VGT to provide a desired amount of EGR flow as represented by block 310.

In one embodiment of the present invention, determination of the specific heat for the current recirculated exhaust gas formulation as represented by block 300 may include utilization of a species tracking model to track the individual chemical species formed during combustion as represented by block 312. Preferably, a plurality of chemical species are tracked for the intake and exhaust. The chemical species may include carbon dioxide 314, oxygen 316, nitrogen 318, and water 320, for example. The relative specific heat contribution for each species is determined as represented by block 322. The individual contributions to the specific heat of the recirculated exhaust gas are then summed to determine the overall specific heat for the current engine operating conditions as represented by block 324.

The specific heat determined for the current conditions of the recirculated exhaust gas may be compared to a reference or calibration specific heat value as represented by block 326. A base EGR flow is determined using the EGR sensor and the base or reference specific heat value as represented by block 328. The base EGR flow may then be adjusted to account for any difference between the calibrated specific heat and the currently determined specific heat as represented by block 330.

Figure 5:
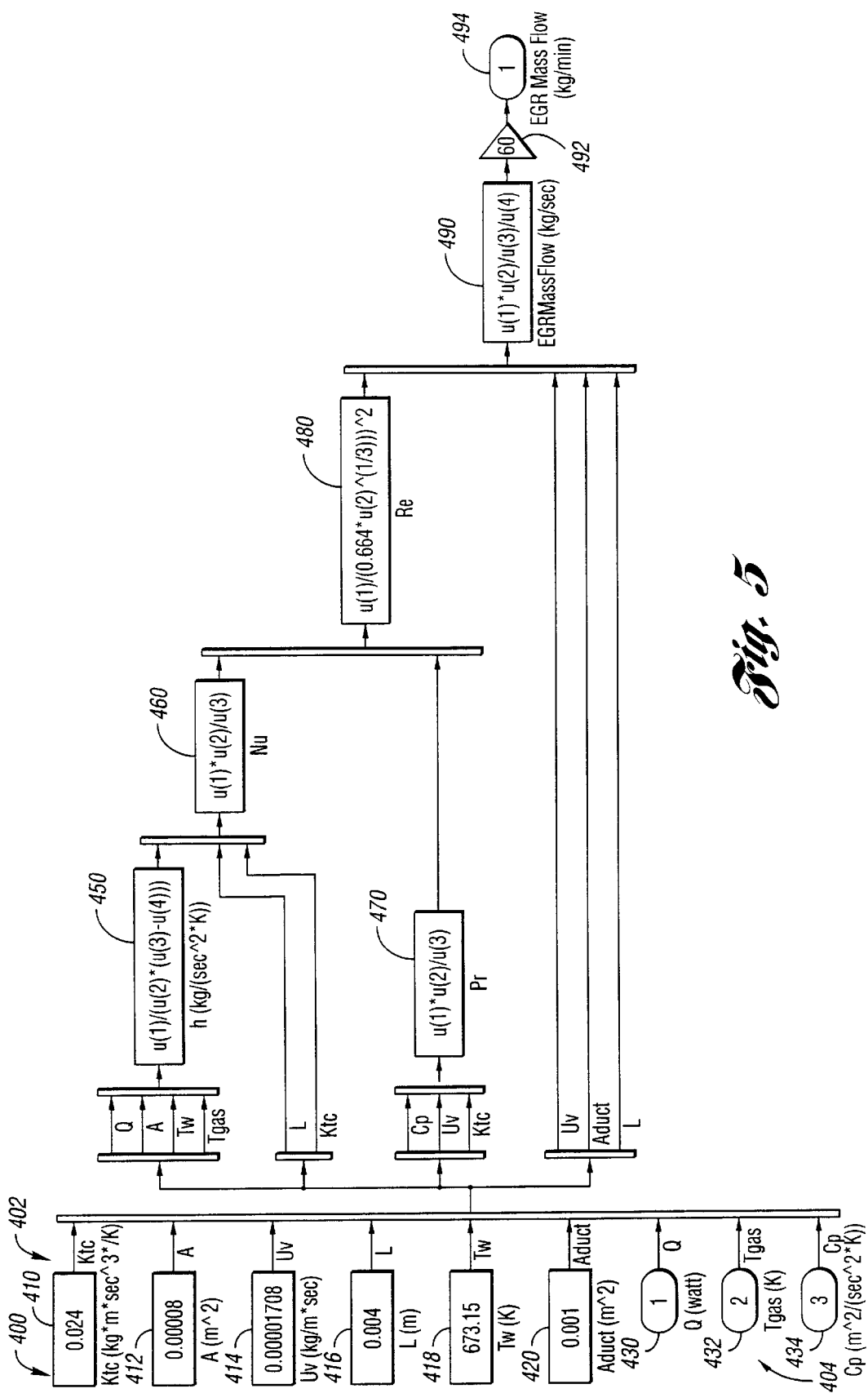
FIG. 5 is a block diagram providing an alternative representation to illustrate calculation of EGR mass flow according to one embodiment of the present invention.

FIG. 5 provides an alternative representation of an EGR mass flow calculation using a thermal anemometer sensor positioned in the EGR flow according to one embodiment of the present invention. Blocks 400 include values and parenthetical units for variables or constants 402 used in determining the EGR mass flow. Inputs 404 represent values based on sensor measurements, calculations, or look-up tables as described below. For the embodiment illustrated in FIG. 5, thermal constant 410 (Ktc) is used to characterize the thermal characteristics of the thermal anemometer element placed in the EGR flow, while area 412 (A) corresponds to the cross sectional area of the thermal element. The dynamic viscosity 414 (Uv) is used in addition to the length of the element that is exposed to the EGR flow represented by block 416 (L). Values or parameters 410–416 are typically provided by the sensor manufacturer and stored in non-volatile memory as part of the engine calibration. Block 418 (Tw) represents a probe temperature set point for the probe or element placed in the EGR flow, while block 420 represents the cross sectional area of the EGR duct near the sensor.

Inputs 404 represent values which are measured, calculated, or otherwise determined or computed. Block 430 (Q) represents the power dissipation of the sensor element required to maintain probe temperature 418. Blocks 432 (Tgas) and 434 (Cp) represent the temperature and specific heat of the EGR gas, respectively. Specific heat 434 is preferably determined using a calculation or look-up table based on a species tracking model as described above.

In operation, the power dissipation will vary depending upon the EGR composition, temperature, flow rate, etc. By determining the power required to maintain the probe temperature 418, and using the various other parameters described (some of which are sensed or measured and some of which are calculated), the EGR flow may be determined.

As illustrated in FIG. 5, an enthalpy calculation 450 (h) is performed based on inputs u(1)–u(4) corresponding to the power dissipation 430 (Q), area 412 (A), probe temperature 418 (Tw) and EGR gas temperature 432 (Tgas). The enthalpy expression in equation form is thus given by:

$$h = \frac{Q}{A} * (Tw - Tgas)$$

The enthalpy calculation 450 (h) (input u(1)) is then used along with the length 416 (L) and heated element thermal constant 410 (Ktc) (corresponding to inputs u(2) and u(3), respectively) to calculate the Nusselt number 460 (Nu), which is defined as the ratio of convection heat transfer to fluid conduction heat transfer under the same conditions. Stated in equation form:

$$N = \frac{hL}{Ktc}$$

The Prandtl number 470 (Pr) is calculated based on inputs u(1)–u(3) corresponding to the specific heat 434 (Cp), dynamic viscosity 414 (Uv), and the thermal constant 410 (Ktc), respectively. The Prandtl number describes the relative thickness of the hydrodynamic and thermal boundary layers and is the ratio of momentum and thermal diffusivities. Stated in equation form:

$$Pr = \frac{Cp\,Uv}{Ktc}$$

Dimensionless quantities 460 (Nu) and 470 (Pr) corresponding to inputs u(1) and u(2), respectively, are then used to calculate a Reynolds number 480. Stated in equation form:

$$Re = \left(\frac{Nu}{0.664 Pr^{1/3}}\right)^2$$

or equivalently:

$$Re = \left(\frac{\frac{QL}{AKtc}(Tw - Tgas)}{0.664\left(\frac{Cp\,Uv}{Ktc}\right)^{1/3}}\right)^2$$

The Reynolds number is then used along with the dynamic viscosity 414 (Uv), duct area 420 (Aduct), and probe length 416 (L), corresponding to inputs u(1)–u(4), respectively, to determine the EGR mass flow as represented by block 490. This value is multiplied by sixty as represented in block 492 to convert the units of EGR flow to kg/min as represented by block 494. The EGR flow value represented by block 494 may then be used to control the engine as described above.

As such, the present invention provides a system and method for calculating EGR flow rate which provides improved accuracy, response, durability, and reliability relative to prior art strategy. The present invention may be used to better optimize the engine performance and fuel economy while reducing emissions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for determining EGR flow in a multi-cylinder internal combustion engine having a sensor for providing a signal indicative of flow of exhaust gas through an EGR circuit, the method comprising:

determining specific heat of the exhaust gas based on current engine operating conditions, wherein determining specific heat of the exhaust gas comprises:

tracking amounts of a plurality of species formed during combustion based on the current engine operating conditions;

determining the specific heat contribution of each specie based on the amount of each specie and an associated specie specific heat; and summing the specific heat contributions determined for each specie to determine the specific heat of the exhaust gas; and determining EGR flow rate based on the determined specific heat and the signal provided by the sensor.

2. The method of claim 1 wherein the plurality of species comprises oxygen, carbon dioxide, nitrogen, and water.

3. The method of claim 1 wherein the step of tracking comprises:

determining the amounts of the plurality of species based on current values for air/fuel ratio, turbo boost pressure, and fuel.

4. The method of claim 1 wherein the step of determining the EGR flow rate comprises:

comparing the determined specific heat of the exhaust gas to a reference value associated with the sensor;

determining a base EGR flow using the sensor signal; and adjusting the base EGR flow using a difference between the determined specific heat of the exhaust gas and the reference value associated with the sensor.

5. The method of claim 4 wherein the base EGR flow is determined using a look-up table.

6. A method for determining EGR flow in a multi-cylinder internal combustion engine having a sensor for providing a signal indicative of flow of exhaust gas through an EGR circuit, the method comprising:

determining specific heat of the exhaust gas based on current engine operating conditions; and determining EGR flow rate based on the determined specific heat and the signal provided by the sensor, wherein determining the EGR flow rate comprises:

comparing the determined specific heat of the exhaust gas to a reference value associated with the sensor;

determining a base EGR flow using the sensor signal; and adjusting the base EGR flow using a difference between the determined specific heat of the exhaust gas and the reference value associated with the sensor.

7. A computer readable storage medium having stored data representing instructions executable by a computer to determine EGR flow in a multi-cylinder internal combustion engine having a sensor for providing a signal indicative of flow of exhaust gas through an EGR circuit, the computer readable storage medium comprising:

instructions for determining specific heat of the exhaust gas based on current engine operating conditions, wherein the instructions for determining specific heat of the exhaust gas comprise:

instructions for tracking amounts of a plurality of species formed during combustion based on the current engine operating conditions;

instructions for determining the specific heat contribution of each specie based on the amount of each specie and an associated specie specific heat; and instructions for summing the specific heat contributions determined for each specie to determine the specific heat of the exhaust gas; and instructions for determining EGR flow rate based on the determined specific heat and the signal provided by the sensor.

8. The computer readable storage medium of claim 7 wherein the plurality of species comprises oxygen, carbon dioxide, nitrogen, and water.

9. The computer readable storage medium of claim 7 wherein the instructions for tracking comprise:

instructions for determining the amounts of the plurality of species based on current values for air/fuel ratio, turbo boost pressure, and fuel.

10. The computer readable storage medium of claim 7 wherein the instructions for determining the EGR flow rate comprise:

instructions for comparing the determined specific heat of the exhaust gas to a reference value associated with the sensor;

instructions for determining a base EGR flow based on the sensor signal; and instructions for adjusting the base EGR flow based on a difference between the determined specific heat of the exhaust gas and the reference value associated with the sensor.

11. The computer readable storage medium of claim 7 further comprising:

instructions for comparing the determined EGR flow to a desired EGR flow to provide an EGR flow error; and instructions for controlling at least one of an EGR valve and turbocharger to reduce the EGR flow error.

12. A system for determining EGR flow in a multi-cylinder internal combustion engine having a plurality of cylinders each with an associated fuel injector, the system comprising:

an EGR valve for diverting a portion of exhaust gas through an EGR circuit to an engine intake;

a sensor for providing a signal indicative of flow of exhaust gas through the EGR circuit;

a turbocharger controllable to vary at least one operating characteristic in response to a command signal; and a controller in communication with the EGR valve, the sensor, and the turbocharger, the controller determining specific heat of the exhaust gas flowing through the EGR circuit based on current engine operating conditions and determining an actual EGR flow rate based on the determined specific heat of the exhaust gas flowing through the EGR circuit and the signal provided by the sensor.

13. The system of claim 12 wherein the controller compares the determined specific heat of the exhaust gas to a reference value associated with the sensor, determines a base EGR flow based on the sensor signal, and adjusts the base EGR flow based on a difference between the determined specific heat of the exhaust gas and the reference value associated with the sensor.

14. The system of claim 12 wherein the controller compares the determined EGR flow to a desired EGR flow to provide an EGR flow error and controls at least one of the EGR valve and turbocharger to reduce the EGR flow error.

15. The system of claim 12 wherein the sensor comprises a thermal anemometer.

16. The system of claim 12 wherein the controller determines specific heat of the exhaust gas by tracking amounts of a plurality of species formed during combustion based on the current engine operating conditions, determines the specific heat contribution of each specie based on the amount of each specie and an associated specie specific heat, and sums the specific heat contributions determined for each specie to determine the specific heat of the exhaust gas.

17. The system of claim 16 wherein the plurality of species comprises oxygen, carbon dioxide, nitrogen, and water.

18. The system of claim 16 wherein the controller determines the amounts of the plurality of species based on current values for air/fuel ratio, turbo boost pressure, and fuel provided to the injectors.

19. A system for determining EGR flow in a multi-cylinder internal combustion engine having a plurality of cylinders each with an associated fuel injector, the system comprising:

means for diverting a portion of exhaust gas through an EGR circuit to an engine intake;

means for determining EGR flow based on specific heat of the exhaust gas flowing through the EGR circuit and heat dissipation of a heated element placed in the EGR flow, wherein the means for determining EGR flow determines specific heat of the exhaust gas by tracking amounts of a plurality of species formed during combustion based on current engine operating conditions; and means for controlling the engine based on the EGR flow.

20. The system of claim 19 wherein the means for controlling the engine compares the determined specific heat of the exhaust gas to a reference value, and adjusts EGR flow based on a difference between the determined specific heat of the exhaust gas and the reference value.

21. The system of claim 19 wherein the means for controlling the engine compares the determined EGR flow to a desired EGR flow to provide an EGR flow error and controls at least one of an EGR valve and turbocharger to reduce the EGR flow error.

22. The system of claim 19 wherein the means for determining EGR flow determines the specific heat contribution of each specie of the plurality of species based on the amount of each specie and an associated specie specific heat, and sums the specific heat contributions determined for each specie to determine the specific heat of the exhaust gas.

23. The system of claim 22 wherein the plurality of species comprises oxygen, carbon dioxide, nitrogen, and water.

24. The system of claim 22 wherein the means for determining EGR flow determines the amounts of the plurality of species based on current values for air/fuel ratio, turbo boost pressure, and fuel provided to the injectors.

25. A method for controlling a multi-cylinder internal combustion engine having a flow of exhaust gas through an EGR circuit, the method comprising:

sensing the flow of exhaust gas through the EGR circuit using a sensor;

determining specific heat of the exhaust gas based on current engine operating conditions, wherein determining specific heat of the exhaust gas comprises:

tracking amounts of a plurality of species formed during combustion based on the current engine operating conditions;

determining the specific heat contribution of each specie based on the amount of each specie and an associated specie specific heat; and summing the specific heat contributions determined for each specie to determine the specific heat of the exhaust gas;

determining EGR flow rate based on the determined specific heat and the signal provided by the sensor;

comparing the determined EGR flow rate to a desired EGR flow rate to provide an EGR flow rate error; and controlling at least one of an EGR valve and turbocharger to reduce the EGR flow error.

26. The method of claim 25 wherein the step of controlling comprises controlling the turbocharger to increase back pressure.

27. The method of claim 25 wherein the plurality of species comprises oxygen, carbon dioxide, nitrogen, and water.

28. The method of claim 25 wherein the step of tracking comprises:

determining the amounts of the plurality of species based on current values for air/fuel ratio, turbo boost pressure, and fuel.

29. The method of claim 25 wherein the step of determining the EGR flow rate comprises:

comparing the determined specific heat of the exhaust gas to a reference value associated with the sensor;

determining a base EGR flow using the sensor signal; and adjusting the base EGR flow using a difference between the determined specific heat of the exhaust gas and the reference value associated with the sensor.

30. A method for controlling a multi-cylinder internal combustion engine having a flow of exhaust gas through an EGR circuit, the method comprising:

sensing the flow of exhaust gas through the EGR circuit using a sensor;

determining specific heat of the exhaust gas based on current engine operating conditions;

determining EGR flow rate based on the determined specific heat and the signal provided by a sensor, wherein determining the EGR flow rate comprises:

comparing the determined specific heat of the exhaust gas to a reference value associated with the sensor;

determining a base EGR flow using the sensor signal; and adjusting the base EGR flow using a difference between the determined specific heat of the exhaust gas and the reference value associated with the sensor;

comparing the determined EGR flow rate to a desired EGR flow rate to provide an EGR flow rate error; and controlling at least one of an EGR valve and turbocharger to reduce the EGR flow error.

* * * * *